(12) United States Patent
Simi

(10) Patent No.: US 8,164,876 B2
(45) Date of Patent: Apr. 24, 2012

(54) TRANSIENT VOLTAGE PROTECTION CIRCUIT AND SYSTEM INCORPORATING THE SAME

(75) Inventor: Victor M Simi, Lexington, KY (US)

(73) Assignee: OSRAM SYLVANIA Inc., Danvers, MA (US)

(*) Notice: Subject to any disclaimer, the term of this patent is extended or adjusted under 35 U.S.C. 154(b) by 256 days.

(21) Appl. No.: 12/554,156

(22) Filed: Sep. 4, 2009

(65) Prior Publication Data

US 2011/0058299 A1  Mar. 10, 2011

(51) Int. Cl.
*H02H 1/00* (2006.01)
(52) U.S. Cl. ......................................... 361/117; 361/119
(58) Field of Classification Search ........... 361/117–119
See application file for complete search history.

(56) References Cited

U.S. PATENT DOCUMENTS

| | | | |
|---|---|---|---|
| 3,979,644 A * | 9/1976 | Everhart | 361/91.6 |
| 4,858,054 A * | 8/1989 | Franklin | 361/57 |
| 5,023,519 A | 6/1991 | Jensen | |
| 5,539,820 A | 7/1996 | Pistilli | |
| 5,675,468 A * | 10/1997 | Chang | 361/119 |
| 6,226,162 B1 | 5/2001 | Kladar et al. | |
| 6,288,883 B1 | 9/2001 | Chen | |
| 6,563,926 B1 | 5/2003 | Pistilli | |
| 6,812,528 B2 | 11/2004 | Uchida | |
| 7,324,319 B2 | 1/2008 | Durth et al. | |
| 7,483,252 B2 | 1/2009 | de Palma et al. | |
| 2005/0041356 A1 | 2/2005 | Storm et al. | |

* cited by examiner

*Primary Examiner* — Danny Nguyen
(74) *Attorney, Agent, or Firm* — Shaun P. Montana

(57) ABSTRACT

A transient voltage protection circuit that protects a load from transient voltages is disclosed. The circuit includes a series combination of a thyristor surge protection device (TSPD), a resistor and a transorb coupled for coupling in parallel with the load, and a fuse coupled between an AC input and the series combination. The TSPD and the transorb are configured to enter a transient mode upon application of a transient voltage to the circuit to shunt current from the load and provide an AC output voltage to the load less than the transient voltage without opening the fuse.

17 Claims, 3 Drawing Sheets

TRANSIENT VOLTAGE PROTECTION CIRCUIT AND SYSTEM INCORPORATING THE SAME

TECHNICAL FIELD

The present application relates to a transient voltage protection circuit and a system incorporating the same.

BACKGROUND

In electrical systems transient voltages, e.g. from a lighting strike, switching equipment on after an outage, etc., may be imparted to a load. In some cases, the transient voltages can constitute a potential risk to sensitive electronic equipment. Various circuit configurations have, therefore, been developed to protect sensitive electronic equipment from transient voltages.

In one such circuit configuration, current associated with the transient voltage may be shunted from the load by a protection circuit coupled in parallel with the load. The protection circuit may include a series combination of a switching element and a limiting element. In general, the switching element may exhibit high impedance during normal operation, but may switch on, i.e. close, to shunt current from the load to the limiting element in the event a transient voltage is imparted to the circuit. The limiting element may exhibit a limited voltage drop under high current conditions to thereby limit the input voltage to the load.

Known parallel protection circuits, however, may require high change in voltage with respect to time and may not operate for all significant transient voltage conditions. Also, such circuits may shunt very high currents from the load and may therefore be physically large to accommodate significant heat dissipation.

BRIEF DESCRIPTION OF THE DRAWINGS

Objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
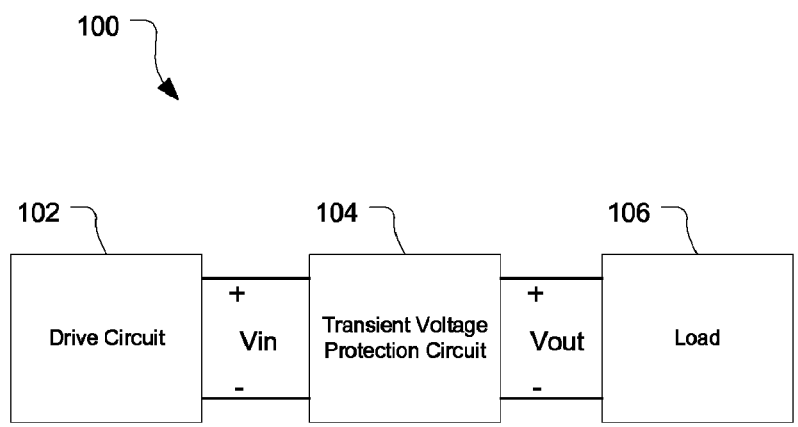
FIG. 1 is a block diagram of one exemplary embodiment of a system consistent with the present disclosure.

FIG. 1 is a simplified block diagram of one exemplary embodiment of a system 100 consistent with the present disclosure. The system includes a drive circuit 102, a transient voltage protection circuit 104 and a load 106. Embodiments described herein may be particularly useful in connection with a load including an electronic ballast for a gas discharge lamp or one or more light emitting diodes. It is to be understood, however, that the load may include any electrical system for which transient voltage protection may be useful or desirable, e.g. a computers, televisions, home theatre systems, and other commercial and consumer products.

The drive circuit 102 may provide an alternating current (AC) input voltage $V_{in}$ to the transient voltage protection circuit 104. Under normal operating conditions, i.e. in the absence of a transient voltage, the transient voltage protection circuit 104 may couple input voltage $V_{in}$ to the load 106 as an AC output voltage $V_{out}$ for driving the load 106. However, in the event of a transient voltage, the voltage $V_{in}$ may significantly depart from the nominal input voltage applied by the drive circuit 102. The transient voltage protection circuit 104 may then limit the output voltage $V_{out}$ to a maximum value to thereby protect the load 106 from potential damage.

As used herein, a "transient voltage" refers to a voltage coupled to the circuit 104 that is beyond the nominal input voltage provided by the drive circuit 102, and includes impulse voltages imparted to the circuit as a result of lighting strikes, powering-up of the system after a power outage, etc. In addition, the term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 2:
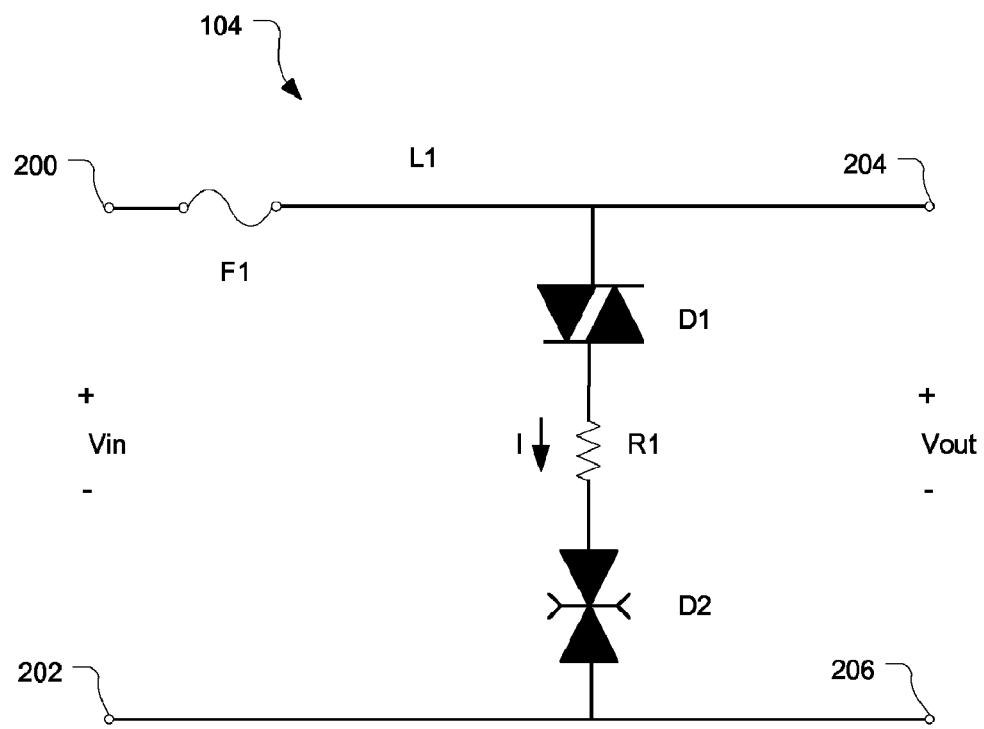
FIG. 2 is circuit diagram of one exemplary embodiment of a transient voltage protection circuit consistent with the present disclosure.

FIG. 2 is a circuit diagram of one exemplary embodiment of a transient voltage protection circuit 104 consistent with the present disclosure. The circuit 104 includes first 200 and second 202 input nodes for receiving the input voltage $V_{in}$, first 204 and second 206 output nodes for providing the output voltage $V_{out}$, a series combination of a switching device D1, a resistor R1 and a limiting device D2 in parallel with the output nodes 204, 206 and configured to be coupled in parallel with the load 106 for providing output voltage $V_{out}$. The input voltage $V_{in}$ is coupled across D1, R1 and D2 through a fuse F1.

The fuse F1 may be configured to open in the event of a short circuit in the transient voltage protection circuit 104 or in the load 106 to protect the drive circuit 102. Fuse F1 may be configured as a known "slow-blow" fuse. For example, F1 may be a wire fuse, e.g. a nickel alloy wire fuse, of sufficient diameter to allow a high current only during the small time period during a protection phase in which the transient voltage protection circuit is turned on to dissipate transient voltage energy. In some embodiments, F1 may be configured to pass 83 amperes during an 8 msec protection phase. Other fuse configurations may be used. For example, F1 could be constructed in a coil-like manner to provide a known resistance. Alternatively, F1 may be a resettable fuse such as a positive temperature coefficient (PTC) resistor.

In the illustrated exemplary embodiment, switching device D1 is configured as a thyristor surge protection device (TSPD) and D2 is configured as a transient voltage suppression (TVS) diode, which is commonly referred to as a transorb. TSPDs and transorbs are well-known and are commercially available. D1 may, for example, be a TRISIL® brand device commercially available from STMicroelectronics of Sunnyvale, Calif. D2 may, for example, be a TRANSIL® brand device commercially available from STMicroelectronics of Sunnyvale, Calif. Although D1 and D2 may be described herein as specific TSPD and transorb devices, respectively, it is to be understood that other devices having similar characteristics may be used as a switching device D1 and/or limiting device D2.

Figure 3:
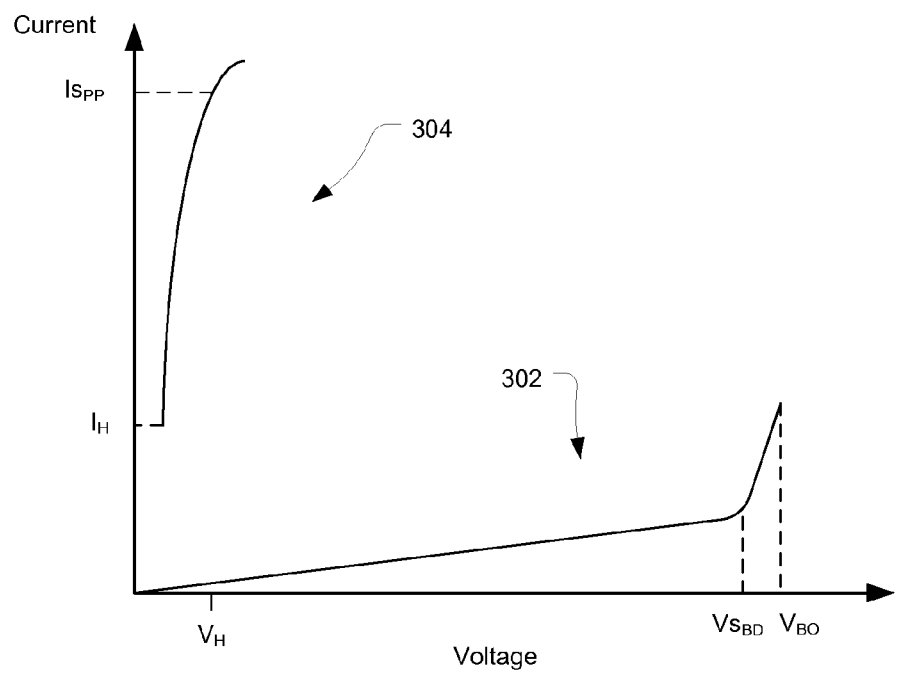
FIG. 3 graphically illustrates a voltage vs. current characteristic associated with one embodiment of a switching element useful in connection with a transient voltage protection circuit consistent with the present disclosure.

FIG. 3 graphically illustrates a voltage vs. current characteristic associated with the TSPD switching device D1. For ease of illustration, FIG. 3 illustrates only a positive characteristic, i.e. performance of the device for positive voltages and currents. It is to be understood, however, that the device may be bidirectional having a corresponding negative characteristic for negative voltages and currents.

The illustrated characteristic includes a first portion 302 showing performance of the device in a standby mode and a second portion 304 showing operation in a transient mode. As shown, in standby mode the device exhibits high impedance with current through the element D1 limited to a low leakage current. However, when the voltage across the device increases beyond the device breakdown voltage $Vs_{BD}$, the impedance of the device drops dramatically. When the voltage reaches a breakover voltage $V_{BO}$, the device enters the transient mode and voltage across the device is limited to a low value $V_H$ with high current through the device up to a peak-point current $Is_{PP}$. The device returns to the standby mode when current through the device drops below a characteristic current $I_H$.

Figure 4:
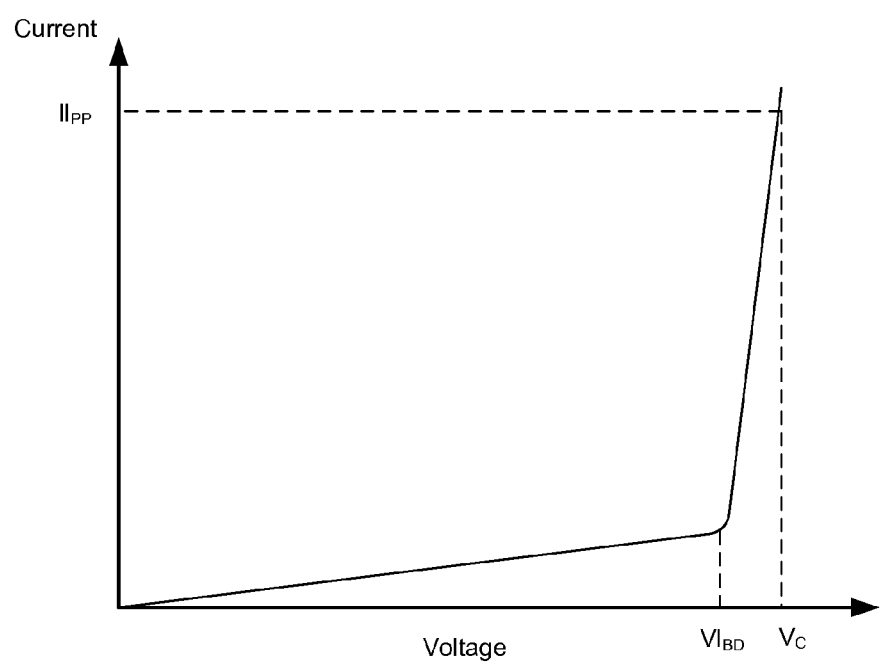
FIG. 4 graphically illustrates a voltage vs. current characteristic associated with one embodiment of a limiting element useful in connection with a transient voltage protection circuit consistent with the present disclosure.

FIG. 4 graphically illustrates a voltage vs. current characteristic associated with the transorb limiting device D2. For ease of illustration, FIG. 4 illustrates only a positive characteristic, i.e. performance of the device for positive voltages and currents. It is to be understood, however, that the device may be bidirectional having a corresponding negative characteristic for negative voltages and currents.

As shown, in a standby mode the device exhibits high impedance with current through the element D2 limited to a low leakage current. However, when the voltage across the device D2 increases beyond the device breakdown voltage $Vl_{BD}$, D2 enters a transient mode. In the transient mode the impedance of D2 drops dramatically and voltage across the device is limited to a clamping voltage $V_C$ with current through the device up to a peak-point current $Il_{PP}$. The device returns to the standby mode when the voltage across the device drops below the breakdown voltage $Vl_{BD}$.

The devices D1 and D2 may be selected to have breakover $V_{BO}$ and break down voltages $Vl_{BD}$, respectively, which, when added together, are higher than the peak voltage of the nominal input voltage $V_{in}$ from the drive circuit 102. Under normal operating conditions therefore, the series combination of D1, R1 and D2 connected in parallel with the load 106 exhibits a very high impedance with the current I through the series combination being limited to very low leakage current. In the event of a voltage transient having a voltage greater than sum of the breakover voltage $V_{BO}$ of D1 and the breakdown $Vl_{BD}$ voltage of D2, D1 enters a low impedance transient mode (turns on) and the voltage across D1 drops to a low level, $V_H$. With D1 turned on, the voltage across D2 is clamped to the clamping voltage $V_C$. The current I through the series combination increases with a voltage drop $V_{R1}$ across the resistor equal to current I multiplied by the value of R1. The maximum voltage as a result of the transient is thus given by:

$$V_{out}=V_H+V_C+V_{R1} \quad \text{(equation 1)}$$

In the event of a transient voltage, therefore, the transient voltage protection circuit 104 provides a reduced voltage $V_{out}$ compared to the transient voltage to protect the load 106 from potential damage that may occur if the transient voltage were applied directly thereto.

The series combination of D1, R1 and D2 may thus dissipate a relatively large amount of energy in a short period of time. In a configuration wherein D1 is a TSPD and D2 is a transorb, the amount of current dissipated in D1 and D2 may directly affect the physical size of D1 and D2. R1 may, therefore, be selected to limit the current I through D1 and D2 in a transient condition. Limiting the current I allows use of TSPD and transorb devices that are physically small. In addition, the value of R1 and the characteristics of the TSPD and transorb devices may be selected in combination with the characteristics of the fuse F1 to allow dissipation of the high energy resulting from a transient voltage without blowing (opening) the fuse F1. This ensures the fuse F1 remains intact for protecting against shorts in the transient voltage protection circuit 104 and in the load 106.

The physical size of the configuration may also or alternatively be limited by selecting the breakdown voltage $Vs_{BD}$ of the TSPD D1 to be higher than the breakdown voltage $Vl_{BD}$ of the transorb D2. This establishes a high standoff voltage, but allows a smaller energy dissipation in the D2, allowing the D2 to be physically smaller with a lower power rating. In general, the breakdown voltage $Vs_{BD}$ of D1 may be selected to be between about 3 times and 7 times the breakdown voltage $Vl_{BD}$ of D2 to achieve a balance between circuit size and transient energy dissipation. In one embodiment, the breakdown voltage $Vs_{BD}$ of D1 may be selected to be about 4.5 to 5.5 times the breakdown voltage $Vl_{BD}$ of D2.

A configuration including resistor R1 selected to limit the current I and a TSPD D1 having a breakdown voltage $Vs_{BD}$ greater than the voltage the breakdown voltage $Vl_{BD}$ of a transorb D2, provides high levels of transient voltage protection for a load in a high temperature environment, e.g. up to 125 C or more, and in a small package without blowing the fuse F1. Moreover, the transient voltage protection circuit is self-resetting since once the transient voltage dissipates, D1 and D2 re-enter a standby mode with the series combination of D1, R1 and D2 providing high impedance and drawing low power during normal operation. This allows use of the configuration for protecting loads such as lamp ballasts, LED lamp devices, and other commercial and consumer electronics.

Figure 5:
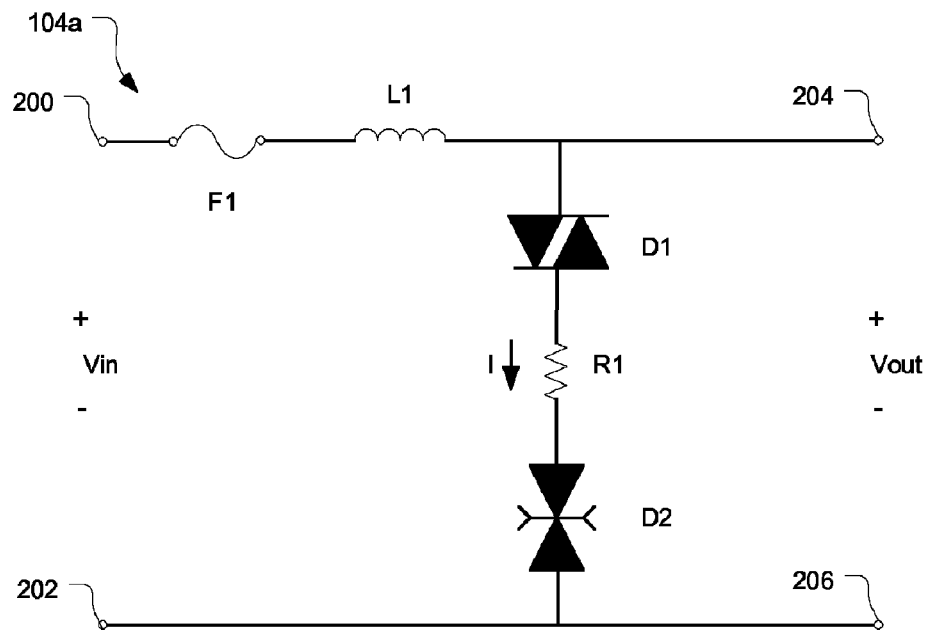
FIG. 5 is circuit diagram of another exemplary embodiment of a transient voltage protection circuit consistent with the present disclosure.

The current I established by a transient voltage may be limited using elements in addition to R1. FIG. 5 for example illustrates an embodiment 104a of a transient voltage protection circuit consistent with the present disclosure including an inductor L1 coupled in series with F1 and to the series combination of D1, R1 and D2. The inductor L1 may function as an electromagnetic interference (EMI) filter, and may exhibit a known resistance. In the event of a transient voltage, L1 may saturate and the current I may be limited by the resistance of L1 and by R1. As discussed above, F1 may be provided in a coil-configuration having a known resistance so that the current I is limited by the known resistance of F1, L1 and R1.

Figure 6:
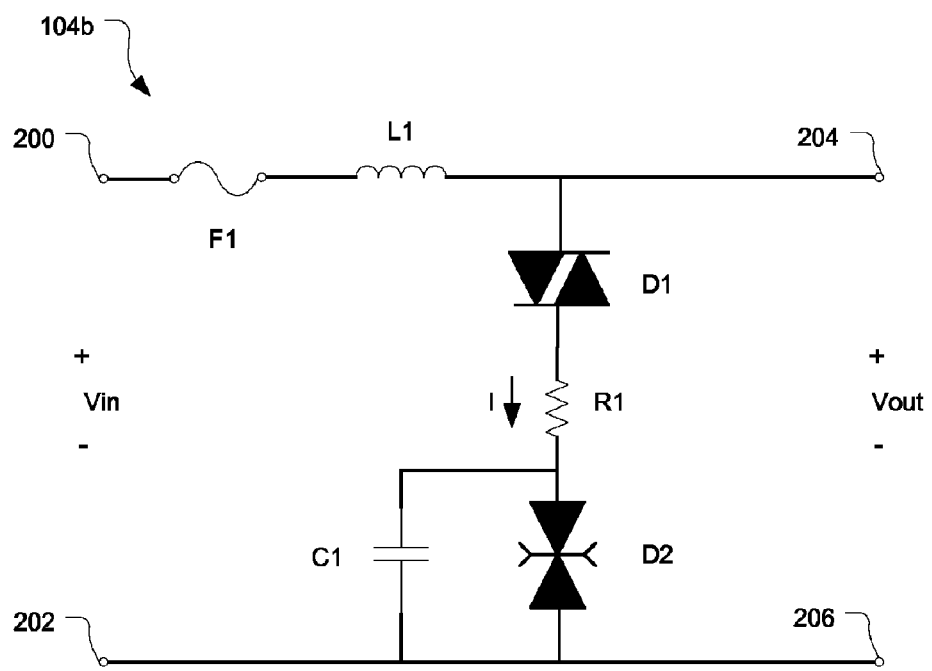
FIG. 6 is circuit diagram of another exemplary embodiment of a transient voltage protection circuit consistent with the present disclosure.

FIG. 6 illustrates another embodiment 104b of a transient voltage protection circuit consistent with the present disclosure. The illustrated exemplary embodiment includes F1, L1, D1, R1 and D2, as described above, along with a capacitor C1 coupled in parallel with D2. The capacitor C1 may be a relatively small value capacitor configured to divert short duration current pulses from D2. In one embodiment as shown in FIG. 6, F1 may be a nickel-allow fuse allowing 83 amperes over a 8 msec protection phase, L1 may be a 200 uH inductor, D1 may be a TSVP as described above with a breakdown voltage of 220V, R1 may be a 10 ohm resistor, D2 may be a transorb having a breakdown voltage of 40 volts and C1 may be a 2 uF capacitor. Such an embodiment may reliably absorb transient voltages of 5000V, without blowing fuse F1, while fitting into a relatively small package.

In an embodiment, there is provided a transient voltage protection circuit. The transient voltage protection circuit protects a load from transient voltages. The transient voltage protection circuit includes first and second input terminals. The first and second input terminals receive an alternating current (AC) input voltage. The transient voltage protection circuit also includes first and second output terminals. The first and second output terminals couple an AC output voltage from the circuit to the load. The transient voltage protection circuit also includes a series combination of a thyristor surge protection device (TSPD), a resistor and a transorb coupled in parallel with the first and second output terminals, and a fuse coupled between the first input terminal and the series combination. The TSPD and the transorb are configured to enter a transient mode upon application of a transient voltage to the circuit to shunt current from the load and provide an AC output voltage less than the transient voltage without opening the fuse.

In another embodiment, there is provided a system including a drive circuit coupled to a load through a transient voltage protection circuit. The transient voltage protection circuit includes first and second input terminals. The first and second input terminals receive an alternating current (AC) input voltage. The transient voltage protection circuit also includes first and second output terminals. The first and second output terminals couple an AC output voltage from the circuit to the load. The transient voltage protection circuit also includes a series combination of a thyristor surge protection device (TSPD), a resistor and a transorb coupled in parallel with the first and second output terminals, and a fuse coupled between the first input terminal and the series combination. The TSPD and the transorb are configured to enter a transient mode upon application of a transient voltage to the circuit to shunt current from the load and provide an AC output voltage less than the transient voltage without opening the fuse.

In yet another embodiment, there is provided a method of providing transient voltage protection to a load. The method includes coupling a series combination of a thyristor surge protection device (TSPD), a resistor and a transorb coupled in parallel with first and second output terminals in parallel with the load, and coupling a fuse between an alternating current (AC) input signal and the series combination. The TSPD and the transorb are configured to enter a transient mode upon application of a transient voltage to the series combination to shunt current from the load and provide an AC output voltage to the load less than the transient voltage without opening the fuse.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A transient voltage protection circuit, wherein the transient voltage protect circuit protects a load from transient voltages, the transient voltage protection circuit comprising:
    first and second input terminals, wherein the first and second input terminals receive an alternating current (AC) input voltage;
    first and second output terminals, wherein the first and second output terminals couple an AC output voltage from the circuit to the load;
    a series combination of a thyristor surge protection device (TSPD), a resistor and a parallel combination of a transorb with a capacitor, the series combination coupled in parallel with the first and second output terminals; and
    a fuse coupled between the first input terminal and the series combination;
    the TSPD and the transorb being configured to enter a transient mode upon application of a transient voltage to the circuit, to shunt current from the load and provide an AC output voltage less than the transient voltage without opening the fuse.

2. A transient voltage protection circuit according to claim 1, wherein a breakdown voltage of the TPSD is greater than a breakdown voltage of the transorb.

3. A transient voltage protection circuit according to claim 2, wherein the breakdown voltage of the TPSD is between about 3 and 7 times the breakdown voltage of the transorb.

4. A transient voltage protection circuit according to claim 2, wherein the breakdown voltage of the TPSD is about 4.5 to 5.5 times the breakdown voltage of the transorb.

5. A transient voltage protection circuit according to claim 1, wherein the fuse is a wire fuse.

6. A transient voltage protection circuit according to claim 1, further comprising an inductor coupled in series with the fuse.

7. A system comprising:
    a drive circuit coupled to a load through a transient voltage protection circuit, the transient voltage protection circuit comprising:
        first and second input terminals, wherein the first and second input terminals receive an alternating current (AC) input voltage;
        first and second output terminals, wherein the first and second output terminals couple an AC output voltage from the circuit to the load;
        a series combination of a thyristor surge protection device (TSPD), a resistor and a parallel combination of a transorb with a capacitor, the series combination coupled in parallel with the first and second output terminals; and
        a fuse coupled between the first input terminal and the series combination;
    the TSPD and the transorb being configured to enter a transient mode upon application of a transient voltage to the circuit, to shunt current from the load and provide an AC output voltage less than the transient voltage without opening the fuse.

8. A system according to claim 7, wherein a breakdown voltage of the TPSD is greater than a breakdown voltage of the transorb.

9. A system according to claim 8, wherein the breakdown voltage of the TPSD is between about 3 and 7 times the breakdown voltage of the transorb.

10. A system according to claim 8, wherein the breakdown voltage of the TPSD is about 4.5 to 5.5 times the breakdown voltage of the transorb.

11. A system according to claim 7, wherein the fuse is a wire fuse.

12. A system according to claim 7, wherein the transient voltage protection circuit further comprises an inductor coupled in series with the fuse.

13. A method of providing transient voltage protection to a load, the method comprising:
coupling a series combination of a thyristor surge protection device (TSPD), a resistor and a parallel combination of a transorb with a capacitor in parallel with first and second output terminals in parallel with the load; and
coupling a fuse between an alternating current (AC) input signal and the series combination, the TSPD and the transorb being configured to enter a transient mode upon application of a transient voltage to the series combination to shunt current from the load and provide an AC output voltage to the load less than the transient voltage without opening the fuse.

14. A method according to claim 13, wherein a breakdown voltage of the TPSD is greater than a breakdown voltage of the transorb.

15. A method according to claim 14, wherein the breakdown voltage of the TPSD is between about 3 and 7 times the breakdown voltage of the transorb.

16. A method according to claim 14, wherein the breakdown voltage of the TPSD is about 4.5 to 5.5 times the breakdown voltage of the transorb.

17. A method according to claim 13, further comprising coupling an inductor coupled in series with the fuse.

* * * * *